K. SATO.
BEET HARVESTER.
APPLICATION FILED NOV. 26, 1913.

1,107,551.

Patented Aug. 18, 1914.

3 SHEETS—SHEET 1.

Witnesses:—
Louis W. Gratz.
Ford W. Harris

Inventor
Kurakichi Sato.
by Townsend & Graham
his attorneys

K. SATO.
BEET HARVESTER.
APPLICATION FILED NOV. 26, 1913.
1,107,551.
Patented Aug. 18, 1914.
3 SHEETS—SHEET 2.
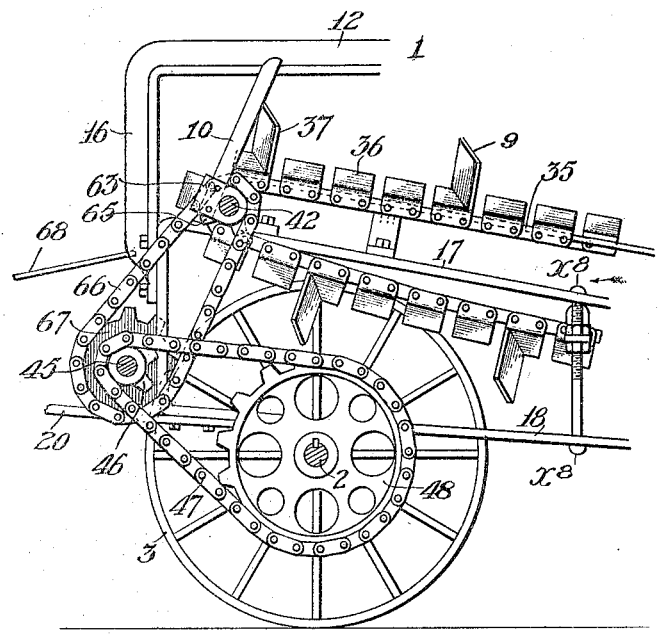
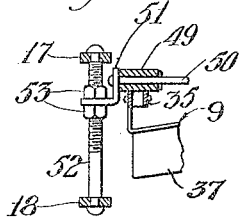
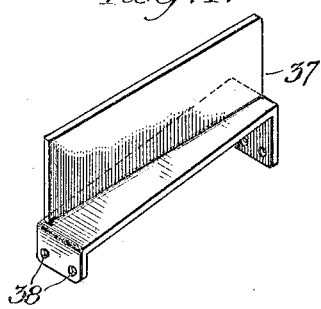
Witnesses:
Louis W. Gratz.
Ford W. Harris
Inventor
Kurakichi Sato.
by Minsendo Graham
his Attorneys

K. SATO.
BEET HARVESTER.
APPLICATION FILED NOV. 26, 1913.

1,107,551.

Patented Aug. 18, 1914.

3 SHEETS—SHEET 3.

Witnesses:
Louis W. Gratz.
Fred W. Lamia

Inventor
Kurakichi Sato.
by Townsend & Graham
his Attorneys

UNITED STATES PATENT OFFICE.

KURAKICHI SATO, OF LOS ANGELES, CALIFORNIA.

BEET-HARVESTER.

1,107,551.  Specification of Letters Patent.  Patented Aug. 18, 1914.

Application filed November 26, 1913. Serial No. 803,347.

*To all whom it may concern:*

Be it known that I, KURAKICHI SATO, a subject of the Emperor of Japan, residing at Los Angeles, in the county of Los Angeles and State of California, have invented a new and useful Beet-Harvester, of which the following is a specification.

My invention relates to harvesters and especially to those adapted to harvest sugar beets or similar roots.

In the production of beet sugar, only the root portion of the beet is used, it being customary to remove the tops and a portion of the head of the beet in the field, the discarded portion being utilized as a fodder for cattle. It is common practice in this country to plow up the beets and cut off this portion by hand, using a heavy knife and piling the trimmed beets in convenient lots. This is expensive due to the direct labor involved and also on account of the losses incurred due to the scarcity of suitable labor in some districts.

The principal object of my invention is to provide a harvester which may be pulled through a field of growing beets, by any suitable draft means, such as horses, and which will dig the beets, remove the tops, and pile the trimmed beets in convenient lots.

A further object is to provide such a machine which will perform its functions solely by the power furnished by the draft means.

Other objects and advantages will appear hereafter.

Figure 1:
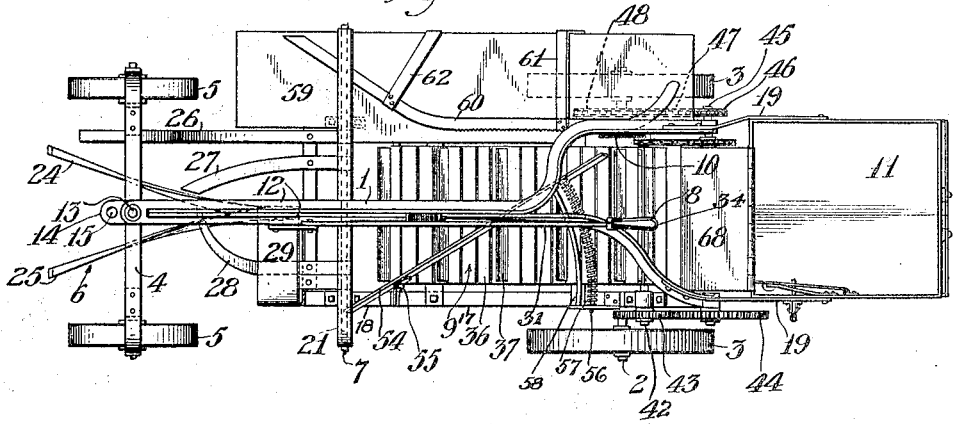
Figure 2:
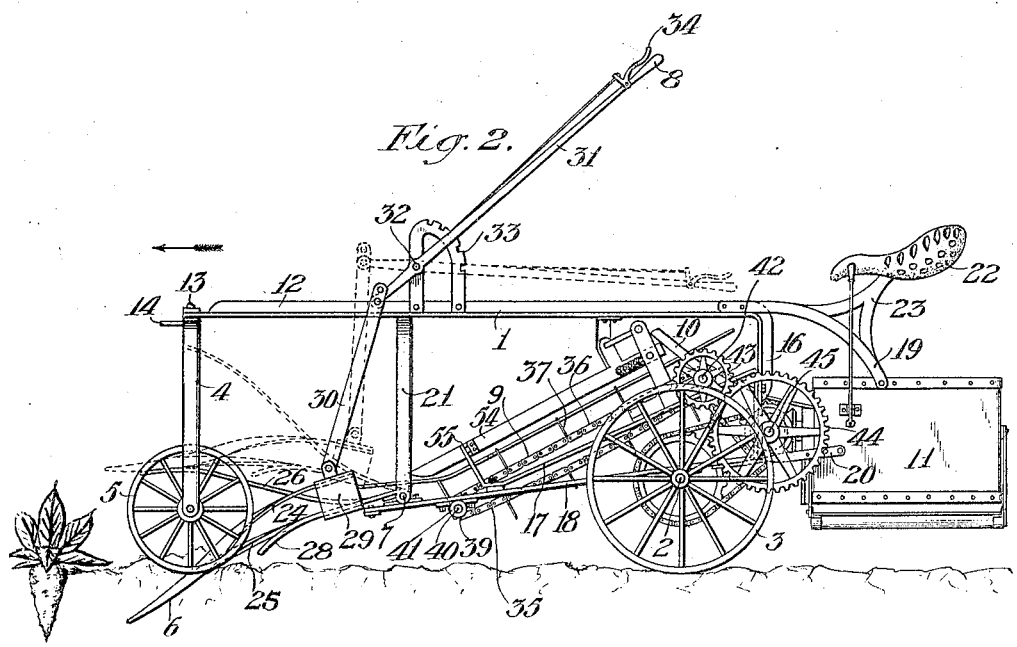
Figure 5:
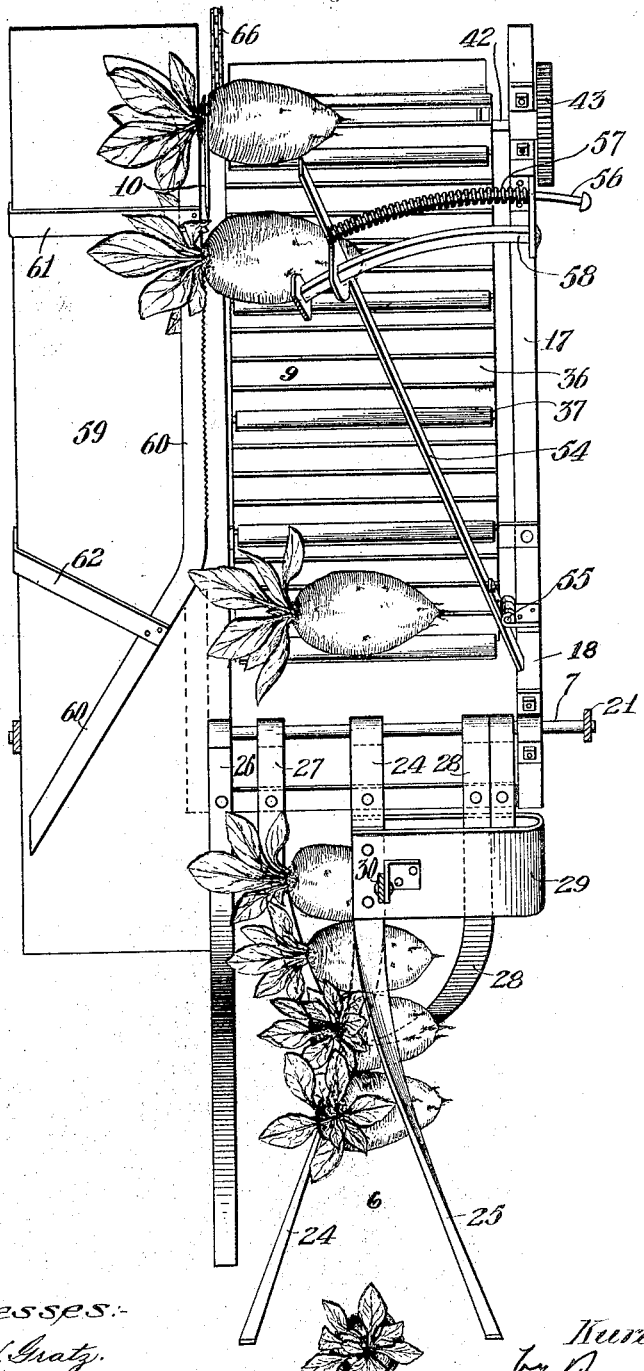

In the drawings, which illustrate one embodiment of my invention: Figure 1 is a plan view of a harvester with the seat removed. Fig. 2 is a side elevation. Fig. 3 is an elevation partly in section of a portion of the harvester. Fig. 4 is a perspective view of an element. Fig. 5 is a plan of the harvester with certain parts removed to show the travel of the beets therethrough, and Fig. 6 is a partial section on the line $x^8$—$x^8$ of Fig. 3, looking in the direction of the arrows.

In these drawings, a frame 1 is carried on an axle 2, to which are secured rear wheels 3, and on a pivoted bow 4 in which turn front wheels 5. A digging device 6 is pivoted on a shaft 7 and raised and lowered by a handle 8. A conveyer 9 actuated by the wheels 3 carries the beets up to the knife 10 from which the trimmed portion passes into a hopper 11, this hopper having dumping doors and an automatic dumping device for actuating these doors whenever the hopper is filled.

Describing the harvester more in detail, the frame 1 consists of a pair of angles 12 which are fastened back to back and which have a pin 13 at the forward end on which the bow 4 turns. This bow 4 is provided with a plate 14 in which is a hole 15 for the attachment of draft means. The angles 12 extend backwardly and down as shown at 16 and fasten to a strap 17 which is rigidly secured to a strap 18. Straps 19 and 20 fasten the hopper 11 to the frame, and a bow 21 carries the shaft 7 to which the strap 18 is pivoted. A seat 22 may be secured to the frame 1 by means of the members 23.

The digging device 6 consists of two prongs 24 and 25 with guiding members 26, 27 and 28 and a U-plate 29, all these parts being turned about the shaft 7 by the link 30 which is pivoted to one end of the lever 31. The lever 31 is pivoted at 32 and is provided with a toothed segment 33 secured to the frame 1 and engaged by a dog carried on the handle 8 and controlled by the grip 34.

The conveyer 9 consists of two chains 35 which carry plain flights 36 and angle flights 37. These flights are made of sheet metal bent in the form shown in Fig. 4 and attached to the chains 35 by riveting through the holes 38. They form a continuous inclined apron upon which the beets are carried. The chains 35 run upon sprockets 39 carried on an idler shaft 40 which turns in bearings 41 secured to the strap 18. The other end of the conveyer is driven by sprockets on the shaft 42 which is driven by the rotation of the wheels 3 through a gear 43 and a gear 44 carried on a countershaft 45. The countershaft 45 is driven by a sprocket 46 driven by a chain 47 from the sprocket 48, the sprocket 48 being rigidly secured to the axle 2 which is rigidly secured and is turned by the wheels 3. For the purpose of keeping the conveyer 9 tight, idler rollers 49 are provided carried on a shaft 50 which is riveted into angles 51 slidable on bolts 52 which are secured to the straps 17 and 18, the position of the angles 51 on the bolts 52 being adjusted by means of the nuts 53.

Placed above the apron is the deflector 54. This consists of a flat bar hinged to the frame 1 at 55 and carrying at its other end a spring center 56, a spring 57, and a guide 58, the parts 56, 57 and 58 being bent on a radius struck from 55.

Supported on the frame 1 is an apron 59 above which is secured a guide 60 carried on straps 61 and 62. The guide may be serrated as shown.

Rotating freely on the shaft 42 is a knife holder 63 which carries the removable knife 10. The knife holder is driven by a sprocket 65 by means of a chain 66 from the sprocket 67, which is secured to the countershaft 45. The ratio of the driving gearing is such that the knife makes a complete revolution every time an angle flight 37 passes the shaft 42. The revolution is so timed that the knife and the angle flights 37 are in the relative position shown in Fig. 3.

An apron 68 is hinged to the front edge of the hopper 11 and extends forwardly, resting on the frame 1.

The method of operation of my invention is as follows: Suitable draft means being attached to the front of the harvester, the harvester is pulled in the direction of the arrow in Fig. 2, the prongs 24 and 25 being dropped into the ground a sufficient distance to engage the beets. These prongs being on a gradual slope, the beet is lifted from the ground, and rides upon the prongs 24 and 25, being forced farther back by the succeeding beets. It will be noted that a line passing through the tips of the prongs 24 and 25 is horizontal, while a line passing through these prongs at the U-plate 29 is vertical, the prong 25 being secured to that plate directly over the prong 24. This twisted form of the prong turns the beets over on their sides with the tops at the left, as shown in Fig. 5, the guiding members 26, 27 and 28 assisting in this turning action. As the beets are removed from the ground they force the beets already in the machine backward, so that they are finally caught by the angle flights 37 of the conveyer 9 which are driven by the wheels 2. The conveyer 9 carries the beets upward and backward to the knife 10 which slices off the top and head. To get the beets into the proper position for this slicing, the deflection bar 54 is provided which rests upon the beets and tends to force them to the left, as illustrated in Fig. 5, the spring 57 giving the proper pressure. This movement is stopped by the guide 60 which is narrow and provided with a serrated edge, so that it quickly cuts through the light tops and comes to a solid bearing on the top of the beet. After the tops are cut off they fall to the ground, the trimmed beets falling into the hopper 11. This hopper is designed to collect a quantity of beets and to dump them in a pile whenever the hopper is filled.

It should be noted that in the form of flight shown in Fig. 4, the surface upon which the beet rests is inclined to allow for the taper of the beet, so that the knife will cut the head on a plane at right angles to the axis of the beet.

I claim as my invention:

1. In a beet harvester, the combination of a conveyer, a knife, a guide placed in fixed relation to said knife, and means for sliding the beets across the conveyer against said guide.

2. In a beet harvester, a conveyer, means for sliding said beets across said conveyer, and a guide for limiting the amount of such sliding movement.

3. In a beet harvester having a conveyer which carries beets to a topping knife, an adjusting device comprising an inclined hinged bar adapted to slide the beets across said conveyer, a spring for providing an elastic tension on said bar, and a guide for guiding the beets in proper relation to the topping knife.

4. A beet harvester comprising digging means, a conveyer receiving beets from said digging means, a topping knife rotating at one side of the conveyer, means for sliding the beets across the conveyer into the path of said knife, and a guide for limiting the amount of such sliding movement.

In testimony whereof, I have hereunto set my hand at Los Angeles, California, this 19th day of November 1913.

KURAKICHI SATO.

In presence of—
FRED A. MANSFIELD,
FORD W. HARRIS.

Copies of this patent may be obtained for five cents each, by addressing the "Commissioner of Patents, Washington, D. C."